Patented Nov. 12, 1940

2,221,214

UNITED STATES PATENT OFFICE 2,221,214

COAGULANT COMPOSITION

George T. Buchanan, Winnsboro, S. C.

No Drawing. Application January 25, 1938,
Serial No. 186,904

2 Claims. (Cl. 260—821)

My invention relates to a new and useful improvement in a coagulant composition adapted for effecting a latex deposit upon an article brought into contact with the latex mixture after having been previously treated with the coagulant composition.

I am aware that various coagulant compositions for effecting a latex deposit upon an article have been previously arrived at and used but it is necessary in the use of the compositions with which I am familiar, that the article to be treated with or dipped in the coagulant composition be free from oil or grease. Since many of the articles which are permanently rubber covered are either machined or stamped from material or made from wire, they are frequently covered with oil or grease. Sometimes this oil or grease is deposited only in spots and sometimes the oil or grease is intentionally placed thereon for preventing rusting. Consequently, such articles brought into contact with oil or grease it is necessary that the oil or grease be first removed before the articles are dipped into or treated with the coagulant composition. This, of course, requires labor and adds to the cost of the article.

It is an object of the present invention to provide a coagulant composition of this class so compounded that articles having oil or grease thereon may be dipped into or treated with the composition with equally as good results as though the articles were free from the oil and grease.

Another object of the invention is the provision of a coagulant composition of this class having an ingredient therein capable of so acting upon oil or grease as to so alter its composition that its effect upon the coagulant composition would be nullified.

Another object of the invention is the provision of a coagulant composition of this class having as one of its ingredients an oil and grease solvent.

Another object of the invention is the provision of a coagulant composition of this class which will be economical of manufacture, easily compounded, safe in its use, and highly efficient in its effects.

Other objects will appear hereinafter.

With the use of coagulant agents as now practiced, the latex is firmly maintained in a dispersed or colloidal state in a suitable carrier, generally water, the dispersion being effected by emulsifying processes.

There are several classifications of articles which are rubber coated. One general classification is where the rubber permanently remains a part of the article and serves as a covering therefor. With such articles it is desirable that the rubber covering adhere as closely as possible to the article.

Another general class may be termed the pattern or mold or class in which a pattern or mold is coated with rubber to give a certain shape to the rubber, the rubber being afterwards removed when it has reached the state where it is capable of retaining the pattern or mold on which it was formed. This second general class embraces two groups. One group consists of goods removed from the mold or pattern and used in such condition and the second group consists of goods which are deposited or coated on a mold or pattern, removed therefrom, turned, and then painted, lacquered or otherwise treated on the surface which contacted the mold or pattern.

There is a third class in which the article is coated from colloidal dispersions with a heavily compounded material having certain characteristics. For instance, latex with a "Duprene" emulsion is naphtha resistant. Latex combined with asphalt is acid resistant. It has been found that with compositions now used, when such colloidal dispersions are coagulated upon a form, the coating consists of a multitude of finely divided particles instead of a homogeneous, non-porous film.

It is another object of the present invention to effect the desired coatings in a better way and to this end to form a base emulsion and then change this base emulsion to such a state that it is best adapted for use in effecting the various classifications of rubber coatings. In carrying out the invention I start with a base emulsion which afterwards can be changed or altered to suit the general classification or work it is to be used upon. I prefer to use an emulsion of naphtha, benzol, gasoline or other very volatile material in water in which the coagulating material is dissolved. The dissolving of the coagulating material in the original emulsion causes the original emulsion to be very critical, that is, it will change phases very easily. As originally made, the water phase is on the outside and the oil phase on the inside but upon adding a quantity of naphtha or other articles of an oily nature, the phases will change causing the water phase to become the internal phase.

This base emulsion may consist of fifty cubic centimeters of volatile such as naphtha. I preper to use a very volatile and cheap petroleum solvent placed on the market under the name of "Apco." Added to this solvent is .4 of a gram of oleic acid. This mixture is then added to fifty cubic centimeters of water containing .2 of a gram of concentrated ammonia (28°) and a very critical emulsion results. If to this critical emulsion forty grams of zinc acetate is added as a coagulating agent, it dissolves and the emulsion becomes still more critical. Instead of zinc acetate other ingredients may be used as a coagulating agent such as calcium chloride, magnesium sulphate or other commonly used coagulating materials.

This base emulsion is adapted for effecting very satisfactory results with the various classifications referred to by slight changes. In using the base emulsion in the first class where it is desired that the rubber coating adhere closely to the body over which it is coated, twenty grams of base emulsion are added to fifty grams of a high-grade rubber cement with a naptha base. A very satisfactory rubber cement for this purpose is a cement placed on the market by the St. Clair Rubber Company as "No. 1523". Where the base emulsion is stirred into the naptha base cement it immediately inverts and the cement and emulsion become one emulsion with the water phase of the base emulsion as the internal phase, the oil phase of the base emulsion combining with the cement to form the external phase. While I prefer to use the rubber cement referred to, any satisfactorily compounded rubber cement for adhering to material may be used as well as a plain rubber jell type cement.

For use in the first group of the second class in which the rubber coating is to be removed from the mold or pattern and used as removed therefrom, I add twenty grams of soapstone to fifty grams of the base emulsion. In place of the soapstone common clay, talc, powdered graphite, etc., may be used. Experience has shown that the soapstone or the like which is used covers the mold or the pattern and renders the rubber coating easily removed after it is dried and cured.

For the second group of the second class where the coating is to be removed and the surface which contacted the mold or pattern to be lacquered or otherwise finished, to twenty grams of the base emulsion I add fifty grams of commercial lacquer cut back in a solvent ready to apply. When the rubber coating is removed from the pattern or mold, the surface which contacted the pattern or mold will have a film of lacquer adhering to it which will be more firmly attached thereto than it would be were it to be applied to the surface of the rubber coating after it is removed from the mold.

In carrying out the process relatively to the third class in which it is desired to have a non-porous, homogeneous heavy film as a coating, I add twenty grams of water and five grams of carbon tetrachloride to twenty grams of the base emulsion. After coagulation occurs the carbon tetrachloride remains mixed with the fine particles of latex and "Duprene", asphalt or other similar ingredients causing these ingredients to jell and swell so that the fine particles flow closely together and agglomerate. The result is that when dry the coating is non-porous and a homogeneous film is effected.

In addition to the coagulants mentioned, one highly efficient in use on wood or other porous material is made by dissolving twenty grams of any of the so-called spirit soluble gums, the most common of which is pine rosin, in thirty grams of the base emulsion. The base emulsion then becomes quite viscid but can be thinned to the desired degree of fluidity by adding water, acetone, alcohol or other volatile materials. For dipping purposes, the mixture can be thinned by the addition of about thirty cubic centimeters of water. Without the addition of water it is suitable for brushing onto the articles with which used. This coagulant adheres evenly to the surface of the wood and clings to the outer surface rather than entering the pores. In actual practice, the tendency of the coagulant to adhere to the outer surface of the wood or other porous material is very important especially on those articles which are subsequently vulcanized. With the use of those coagulants which are absorbed by the porous material, or penetrate into the pores thereof, freedom of evaporation is prevented in the vulcanizing operation with the result that frequently the rubber coating is caused to blow or burst from internal pressure unless previously dried over a long period of time. Consequently, with the coagulants adhering to the outer surface of the porous body, the length of time required for the drying operation is considerably reduced.

In this way I have provided a base emulsion which is adapted for use with various types of coagulants depending upon the particular type of work which is being carried on and in all of the classifications the feature of being capable of adhering to an article regardless of whether it is covered with grease, oil or the like, is present. An efficient type of product is thus obtained with a minimum cost resulting from the use of the base emulsion.

It is believed obvious that the formulae given herein are examples which define the scope of the present invention and that, while still remaining within such scope, the said formulae may be varied and altered.

What I claim as new is:

1. In a coagulant composition adapted for effecting a latex deposit upon articles brought into contact therewith, a base emulsion comprising a volatile solvent, water, oleic acid, ammonia, zinc acetate; and rubber cement added to said base emulsion; and pine resin added to said emulsion.

2. In a coagulant composition adapted for effecting a latex deposit upon articles brought into contact therewith, a base emulsion comprising the following ingredients in the proportions mentioned, to wit: fifty cubic centimeters of a volatile solvent such as naptha, .4 of a gram of oleic acid, fifty cubic centimeters of water, .2 of a gram of concentrated ammonia, forty grams of zinc acetate; and mixed with said emulsion fifty grams of rubber cement having a naptha base; and twenty grams of pine resin added to each fifty grams of said base emulsion.

GEORGE T. BUCHANAN.